Oct. 30, 1962    R. WOODLEY    3,060,616
FISHING DEVICE
Filed June 23, 1961    2 Sheets-Sheet 1
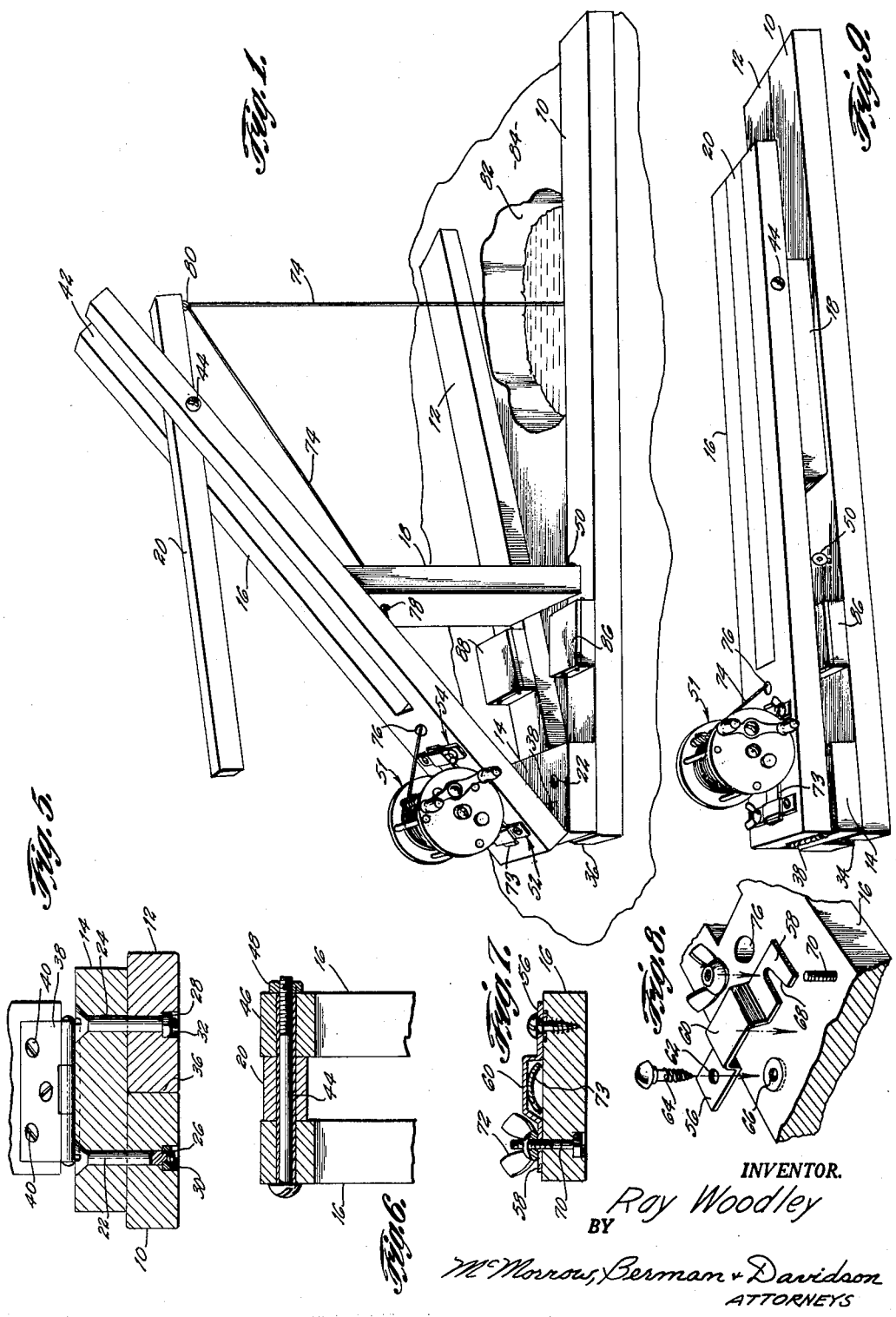
INVENTOR.
Roy Woodley
BY
McMorrow, Berman & Davidson
ATTORNEYS

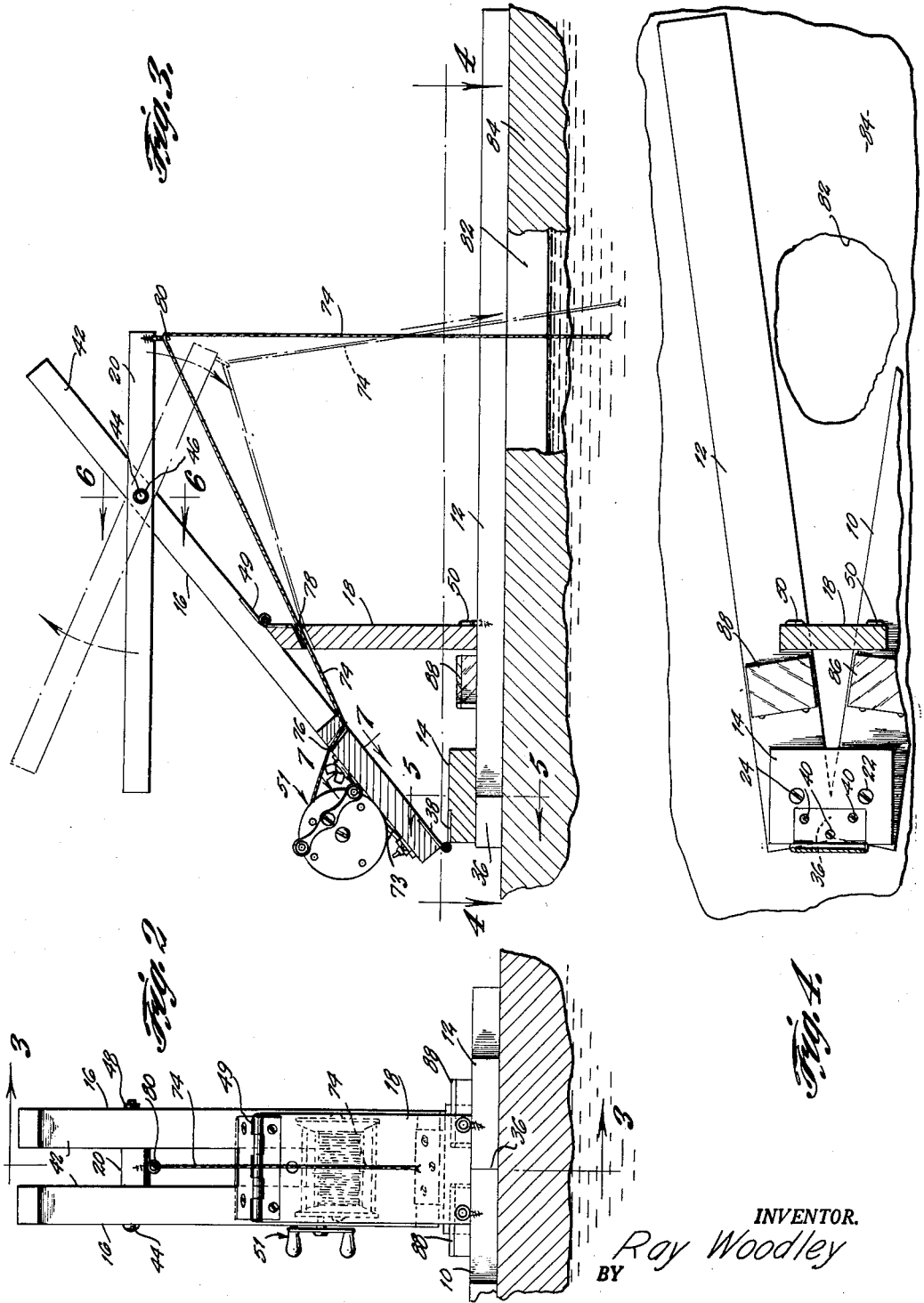

United States Patent Office 3,060,616
Patented Oct. 30, 1962

3,060,616
FISHING DEVICE
Ray Woodley, 219 1st Ave., Mobridge, S. Dak.
Filed June 23, 1961, Ser. No. 119,132
6 Claims. (Cl. 43—17)

This invention relates to fishing equipment, and in particular to a mounting device for a fish line and associated reel, spool or the like, which permits unattended fishing, or intermittently attended fishing, without the risk of loss of the fishing gear. This problem is most acute in connection with fishing through holes in ice-covered waters, since long, tedious periods are involved, fishing rods are impractical, and means for anchoring the line or other gear are not usually available. Since the attention of the fisherman is frequently diverted, as for warming the hands, eating, working on tackle, or attending other lines, the securement of the line against loss through the hole in the ice becomes an important consideration.

It is therefore an object of the invention to provide a mounting for fishing lines which will guard against loss during the period when the gear is unattended. A further object is to provide a mount which is particularly adapted for operation in association with holes in ice fishing. Another object is to provide a mount for anchoring fishing gear which includes a signal device to indicate action on the submerged line. More particularly it is an object to provide a mounting frame for a line which will straddle a hole in ice, be secure against overturning and be collapsible into compact form for ready portability and storage. It is also among the objects to provide a mounting frame which is simple in structure, easy of fabrication, and low in cost.

These and other ends, which will be apparent to those skilled in the art, are attained by the present invention, a preferred form of which is described in the following specification, as illustrated in the drawings, in which:

FIGURE 1 is a perspective view of the mount shown in working position at an ice hole, FIGURE 2 is an end elevational view of the mount, as seen from the right in FIGURE 1, FIGURE 3 is a sectional view taken on the plane of the line 3—3 of FIGURE 2, FIGURE 4 is a sectional view taken on the plane of the line 4—4 of FIGURE 3, FIGURE 5 is a sectional view taken on the line 5—5 of FIGURE 3, FIGURE 6 is a sectional view taken on the line 6—6 of FIGURE 3, FIGURE 7 is a sectional view taken on the line 7—7 of FIGURE 3, FIGURE 8 is a perspective view of the details shown in FIGURE 7, and FIGURE 8 is a view similar to FIGURE 1, showing the mounting frame in collapsed condition.

Referring to the drawings by characters of reference, there is shown, in FIGURE 1, a collapsible framework, the main parts of which comprise a pair of base members, or feet, 10, 12, mounted for swinging movement in a common plane beneath a connector block 14, to provide a crowfoot arrangement, a boom member 16 mounted on block 14, for swinging movement, in elevation, to and from the horizontal, a swingable supporting leg 18 carried by boom 16, and a swinging arm 20 which is pivotally mounted on the boom, and constitutes the working end thereof.

In greater detail, the connector block 14 carries a pair of bolts 22, 24, on which the respective foot members 10, 12 are pivoted, being secured by nuts 26, 28, received in counterbores 30, 32, in the lower faces of the foot members. As seen in FIGURE 9, when the system is collapsed the members 10, 12 are in contact along facing edges, so that in order to provide clearance for the spreading movement, the inner corners at the pivoted end are bevelled to provide a V-form recess 34 (FIGURE 9) formed by faces 36 which make mutual contact in the spread position.

The main boom 16 is articulated to the connector block 14 by a hinge 38, secured by screws 40, and has slot 42 extending from its outer end throughout the major portion of its length, to accommodate the swinging auxiliary member 20 of the boom, the latter being pivoted, at a position spaced from its midpoint, on a bolt 44, bushed in a sleeve 46 carried by the tines of forked boom 16, and secured by a nut 48. Swinging member 20 is of a size to fit in notch 42 of the boom, and the pivot is so located that the rear end of the swinging member tends to hang downward, when subject to its own weight only. The support 18 is swingably mounted on a hinge 49 on the tines of forked boom 16 and is conveniently set in upright position by eye screws 50 in foot members 10, 12. The hinge also serves as a stop for member 20 in its collapsed position.

A conventional reel 51 is mounted on the rear end of boom 16 by means of a pair of anchoring straps, 52, 54, one of which is shown in detail in FIGURES 7 and 8, and comprises end flanges 56, 58, joined by a central arch 60 which receives one of the mounting tabs 73 of the reel. One flange, 56, has a bore 62 receiving an anchoring and pivoting screw 64 which is secured in boom 16, and a washer 66 is preferably provided, under the flange, for a bearing surface. Flange 58 has a side opening slot 68 which is positioned to engage a stud bolt 70 carried by boom 16, and the flange is locked in place by a wing screw 72 received on bolt 70. It will be seen that the reel may be mounted or dismounted by the simple device of loosening one of the wing screws and swinging the strap away from one tab 73 of the reel, after which the other tab may be slid away from its anchoring mounting.

The fishing line 74 runs from the reel 51 through a slant bore 76 in the boom, and from thence through a slant bore 78 in the boom-supporting leg 18, and finally through the loop or eye of a screw 80 secured to the underside of swinging boom member 20, near its outer end. With feet 10, 12 straddling the hole 82 in the ice 84, the screw 80 will overlie the hole and the weighted line will therefore extend substantially vertically downward. The location of pintle 44 will be so arranged with respect to the length of swing member 20 and the weight on the bottom of the line 74 that the member 20 will be swung from its nested position in slot 42 but not sufficiently to assume a vertical position. In this situation, the member 20 is in a condition of delicate equilibrium, and any disturbance in the immersed line will be manifest, in a degree corresponding to its magnitude, in a swinging movement of member 20.

To collapse the system the boom is swung upwardly until supporting leg 18 clears the screws 50, and the boom is lowered, with leg 18 being swung upward to a position against the underside of the boom. With the load off the swinging element 20, the latter swings into position in notch 42, being arrested in that position by the hinge 49. It will be seen from FIGURE 9, that the boom is spaced above feet 10, 12 by virtue of connector block 14 and leg 18. This leaves space which may be utilized to advantage by affixing to the feet 10, 12, utility boxes 86, 88, of metal or plastic, which serve to keep miscellaneous items of fishing gear, tools, or the like.

It will thus be seen that there has been provided a device which provides an efficient, sturdy and dependable framework, of stable equilibrium, for anchoring a fish line, which obviates the need for constant attendance, yet guarantees against loss of equipment, and which, further, provides an indicator for action on the fish line, and is capable of ready collapse to compact condition for transport and storage.

While a certain preferred embodiment has been shown and described, modifications will be apparent to those skilled in the art, in the light of this disclosure, and the invention should not, therefore, be deemed as limited, except insofar as shall appear from the spirit and scope of the appended claims.

I claim:

1. A mount for fish lines and associated gear comprising a block having a pair of spaced, parallel pintles, an elongate, supporting foot swingably mounted near one end on each of said pintles whereby said feet may be spread fanwise to resist overturning moments on the mount, a boom swingably mounted at one end on said block on an axis transverse to the axial direction of said pintles, and having a longitudinal slot in its distal end, extending a substantial portion of its length, said boom extending from said block in overlying relationship to said feet, an auxiliary boom member substantially coextensive with said slot, and mounted on said boom for swinging movement, within said slot, on an axis parallel to the axis of swing of said boom and outwardly of the center of gravity of said member, a supporting leg swingably mounted on the under side of said boom, for holding said boom in elevated position, stop means for locating said leg in supporting position, and mounting means for a reel on said boom, comprising a pair of straps, at least one of which is pivoted for swinging movement at one end and comprises a lateral slot at the other end, and said boom, said leg, and said member having guide means for a fish line whereby when a fish pulls on the line the auxiliary boom member will be swung on its axis and thereby act as a signal to a fisherman that a fish has been caught.

2. A mount for fish lines and associated gear comprising a block having a pair of spaced, parallel pintles, an elongate, supporting foot swingably mounted near one end on each of said pintles whereby said feet may be spread fanwise to resist overturning moments on the mount, a boom swingably mounted at one end on said block on an axis transverse to the axial direction of said pintles, and having a longitudinal slot in its distal end, extending a substantial portion of its length, said boom extending from said block in overlying relationship to said feet, an auxiliary boom member substantially coextensive with said slot, and mounted on said boom for swinging movement, within said slot, on an axis parallel to the axis of swing of said boom and outwardly of the center of gravity of said member, a supporting leg swingably mounted on the under side of said boom, for holding said boom in elevated position, stop means for locating said leg in supporting position, and mounting means for a reel on said boom, and said boom, said leg, and said member having guide means for a fish line whereby when a fish pulls on the line the auxiliary boom member will be swung on its axis and thereby act as a signal to a fisherman that a fish has been caught.

3. The device of claim 2, said pintles being so located that said feet, when collapsed, lie in close, side-by-side relation, and the inner corners of said feet, at the pivoted end, being shaped for clearance during swinging movement of the feet when opening.

4. A mount for fish lines and associated gear comprising a block having a pair of spaced, parallel pintles, a pair of feet mounted on said pintles for fanwise, angular adjustment, a boom swingably mounted at one end on said block on an axis transverse to the axial direction of said pintles, and having a forked, outer end, said boom extending from said block in overlying relationship to said feet, an arm pivoted intermediate its length to the tines of the worked end of said boom, for swinging movement between said tines, a supporting leg swingably mounted on the under side of said boom, for holding said boom in elevated position, and mounting means for a reel on said boom, said boom, arm and leg having guide means for a fish line whereby when a fish pulls on the line the arm will be swung on its axis and thereby act as a signal to a fisherman that a fish has been caught.

5. A mount for fish lines and associated gear comprising a block having a pair of spaced, parallel pintles, a pair of feet mounted on said pintles for fanwise, angular adjustment, a boom swingably mounted at one end on said block in overlying relation to said feet on an axis transverse to the axial direction of said pintles, and having a forked, outer end, an arm pivoted intermediate its length to the tines of the forked end of said boom, for swinging movement between said tines and clearing the bight end of said tines so as to be fully receivable therebetween, a supporting leg swingably mounted on the under side of said boom, for holding said boom in elevated position, and extending between the tines to form a stop for said arm mounting means for a reel on said boom, and guide means on one end of said arm, on the supporting leg adjacent the upper end thereof, and on the boom near the mounting means for guiding the fishing line.

6. A mount for fish lines and associated gear comprising a block having a pair of spaced, parallel pintles, a pair of feet mounted on said pintles for fanwise, angular adjustment, a boom swingably mounted at one end on said block in overlying relation to said feet on an axis transverse to the axial direction of said pintles, and having a forked, outer end, an arm pivoted intermediate its length to the tines of the forked end of said boom, for swinging movement between said tines and clearing the bight end of said tines so as to be fully receivable therebetween, means for supporting said boom in elevated position, mounting means for a reel on said boom, and guide means on one end of said arm, on the supporting means adjacent the upper end thereof, and on the boom near the mounting means for guiding the fishing line.

References Cited in the file of this patent

UNITED STATES PATENTS

| | | |
|---|---|---|
| 1,800,607 | Decker | Apr. 14, 1931 |
| 2,924,038 | Dahlgren | Feb. 9, 1960 |